United States Patent
Hong

(10) Patent No.: US 12,335,790 B2
(45) Date of Patent: Jun. 17, 2025

(54) CONNECTION CONFIGURATION METHOD AND APPARATUS, COMMUNICATION DEVICE AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 356 days.

(21) Appl. No.: 17/618,402

(22) PCT Filed: Jun. 14, 2019

(86) PCT No.: PCT/CN2019/091369
§ 371 (c)(1),
(2) Date: Dec. 10, 2021

(87) PCT Pub. No.: WO2020/248255
PCT Pub. Date: Dec. 17, 2020

(65) Prior Publication Data
US 2022/0279410 A1    Sep. 1, 2022

(51) Int. Cl.
*H04W 4/00* (2018.01)
*H04W 36/00* (2009.01)
*H04W 36/14* (2009.01)

(52) U.S. Cl.
CPC ... *H04W 36/0016* (2013.01); *H04W 36/0072* (2013.01); *H04W 36/144* (2023.05)

(58) Field of Classification Search
CPC .. H04W 36/00; H04W 36/0016; H04W 88/06
See application file for complete search history.

(56) References Cited

U.S. PATENT DOCUMENTS

| | | | |
|---|---|---|---|
| 8,451,776 B2* | 5/2013 | Dayal | H04W 72/1215 370/328 |
| 2016/0242090 A1* | 8/2016 | Chen | H04W 36/00698 |

(Continued)

FOREIGN PATENT DOCUMENTS

| | | |
|---|---|---|
| CN | 103999536 A | 8/2014 |
| CN | 105827786 A | 8/2016 |
| WO | WO-2015139752 A1 * | 9/2015 ........ H04W 36/0009 |

OTHER PUBLICATIONS

PCT/CN2019/091369, English translation of the International Search Report dated Feb. 26, 2020, 2 pages.

(Continued)

*Primary Examiner* — Shantell L Heiber
(74) *Attorney, Agent, or Firm* — Cozen O'Connor

(57) ABSTRACT

A connection configuration method includes: configuring a time parameter for a handover of a multi-card terminal from a first communication system to a second communication system; and sending the time parameter to a multi-card terminal so that the time parameter for the handover of the multi-card terminal from the first communication system to the second communication system is configured to enable a base station side to know the time of the handover of the multi-card terminal from the first communication system to the second communication system to perform operations. Therefore, a problem of connection conflict and resource waste due to the first communication system not knowing the situation of the handover of the multi-card terminal is reduced.

14 Claims, 8 Drawing Sheets

(56) References Cited

U.S. PATENT DOCUMENTS

2016/0353313 A1* 12/2016 Reyes ................ H04W 60/02
2017/0208611 A1    7/2017 Chincholi et al.
2018/0063735 A1*  3/2018 Raghunathan ........ H04W 24/08
2018/0077728 A1   3/2018 Shi et al.
2020/0304984 A1*  9/2020 Dhanapal ............ H04W 56/001

OTHER PUBLICATIONS

Indian Patent Application No. 202247001846; Office Action dated May 30, 2022; 7 pages.
European Patent Application No. 19932961.6, extended Search and Opinion dated Jun. 1, 2022; 12 pages.

* cited by examiner

CONNECTION CONFIGURATION METHOD AND APPARATUS, COMMUNICATION DEVICE AND STORAGE MEDIUM

CROSS-REFERENCE TO RELATED APPLICATION

This application is a national phase of International Application No. PCT/CN2019/091369, filed on Jun. 14, 2019, the content of which is hereby incorporated by reference in its entirety.

TECHNICAL FIELD

This disclosure relates to, but is not limited to, a field of radio communication technologies, and particularly to a connection configuration method and apparatus for a terminal capable of being used in more than one communication system.

BACKGROUND

With the development of radio communication technologies, a large number of multi-card mobile terminals have appeared on the market. A multi-card terminal or mobile phone has multiple subscriber identification modules and is capable of operating in more than one communication system, where the communication systems may belong to the same or different operators. The multi-card mobile phones generally have two typical use cases. In the first case, a business user has a private card and a business card, and the two cards are both used on the same mobile phone to access communication systems belonging to different operators, or different subscriber accounts on a single communication system, for example. In the second case, an ordinary user has multiple private cards used for different businesses, and the cards may be used on communications systems belonging to the same operator or different operators.

SUMMARY

In one embodiment, a connection configuration method includes: configuring a time parameter for a handover of a multi-card terminal from a first communication system to a second communication system; and sending the time parameter to the multi-card terminal.

In one embodiment, a connection configuration method includes:
 receiving a time parameter for performing a handover from a first communication system to a second communication system; and
 leaving the first communication system and performing the handover to the second communication system within a duration corresponding to the time parameter.

In one embodiment, a communication device includes: an antenna, a memory and a processor. The processor is connected to the antenna and the memory respectively, and is configured to control the antenna to send and receive radio signals by executing an executable program stored on the memory, and is configured to execute above connection configuration method.

In one embodiment, a non-transitory computer-readable storage medium includes an executable program. When the executable program is executed by a processor, the above connection configuration method is implemented.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

Figure 1:
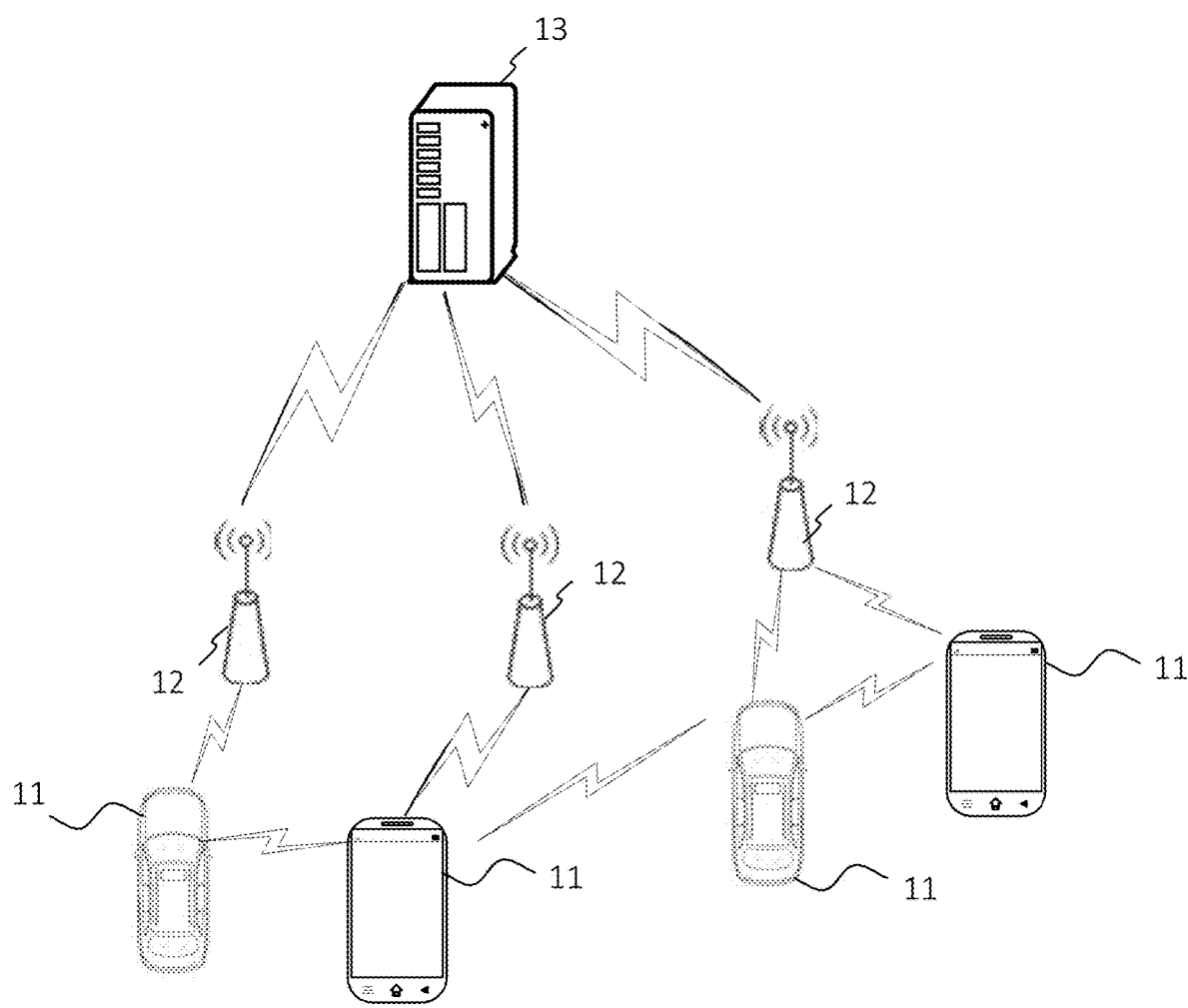
FIG. 1 is a schematic diagram illustrating a radio communication system according to embodiments of the disclosure.

FIG. 1 is a schematic diagram illustrating a radio communication system according to embodiments of the disclosure. As illustrated in FIG. 1, the radio communication system is a communication system based on cellular mobile communication technology. The radio communication system may include several terminals 11 and several base stations 12.

The terminal 11 may be a device that provides voice and/or data connectivity to the user. The terminal 11 can communicate with one or more core networks via a radio access network (RAN). The terminal 11 can be an Internet of Things terminal, such as a sensor device, a mobile phone (or called a cellular phone), and a computer having the Internet of Things terminal, such as, a fixed, portable, pocket-sized, handheld, built-in computer or vehicle-mounted device, e.g., a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle, or a vehicle-mounted device. For example, the terminal 11 may be a trip computer having a radio communication function or a radio communication device externally connected to a trip computer. Alternatively, the terminal 11 may also be a roadside device, such as, a street lamp, a traffic light, or other roadside devices having a radio communication function.

The base station 12 may be a network side device in the radio communication system. The radio communication system may be the fourth-generation mobile communication (4G) system, also known as the long term evolution (LTE) system. The radio communication system may also be a 5G system, also known as the new radio (NR) system or 5G NR system. Alternatively, the radio communication system may also be a next generation system of the 5G system. The access network in the 5G system can be called new generation-radio access network (NG-RAN) or MTC system.

The base station 12 may be an evolved NodeB (eNB) adopted in the 4G system. Alternatively, the base station 12 may also be a gNodeB (gNB) adopting a centralized and distributed architecture in the 5G system. When the base station 12 adopts the centralized and distributed architecture, it generally includes a central unit (CU) and at least two distributed units (DUs). The CU is provided with protocol stacks of a packet data convergence protocol (PDCP) layer, a radio link control (RLC) layer, and a media access control (MAC) layer. The DU is provided with a protocol stack of a physical (PHY) layer. The specific implementation of the base station 12 is not limited in embodiments of the disclosure.

A radio connection can be established between the base station 12 and the terminal 11 through a radio air interface. In different implementations, the radio air interface is a radio air interface based on the fourth-generation mobile communication (4G) standard. Alternatively, the radio air interface is a radio air interface based on the fifth-generation mobile communication (5G) standard. For example, the radio air interface is the NR. Alternatively, the radio air interface can also be a radio air interface based on a next generation mobile communication standard of the 5G.

In some embodiments, an end to end (E2E) connection may also be established between the terminals 11, for example, scenes of vehicle to vehicle (V2V) communication, vehicle to Infrastructure (V2I) communication, and vehicle to pedestrian (V2P) communication in a vehicle to everything (V2X) communication.

In some embodiments, the radio communication system may further include a network management device 13.

The several base stations 12 are connected to the network management device 13 respectively. The network management device 13 may be a core network device in the radio communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit, or a home subscriber server (HSS). The implementation form of the network management device 13 is not limited in embodiments of the disclosure.

When the handover of the multi-card terminal from one communication system belonging to an operator to a communication system belonging to another operator is performed, or from a first communication system to a second communication system belonging to the same operator, the terminal needs to stop a current RRC connection in the first communication system. That is, the current service of the terminal in the first communication system will be disconnected, and the RRC connection and the service will be re-established when the terminal returns to the first communication system, which affects continuity of the service. When trying to connect to the second communication system, since the communication resources are already occupied by the first communication system, connection conflicts may be caused. In addition, the base station may continue to page the terminal after the terminal is disconnected from the first communication system, resulting in waste of paging resources of the system.

Therefore, embodiments of the disclosure provide a connection configuration method, a connection configuration apparatus, a communication device, and a storage medium, which will be described in detail below.

Figure 2:
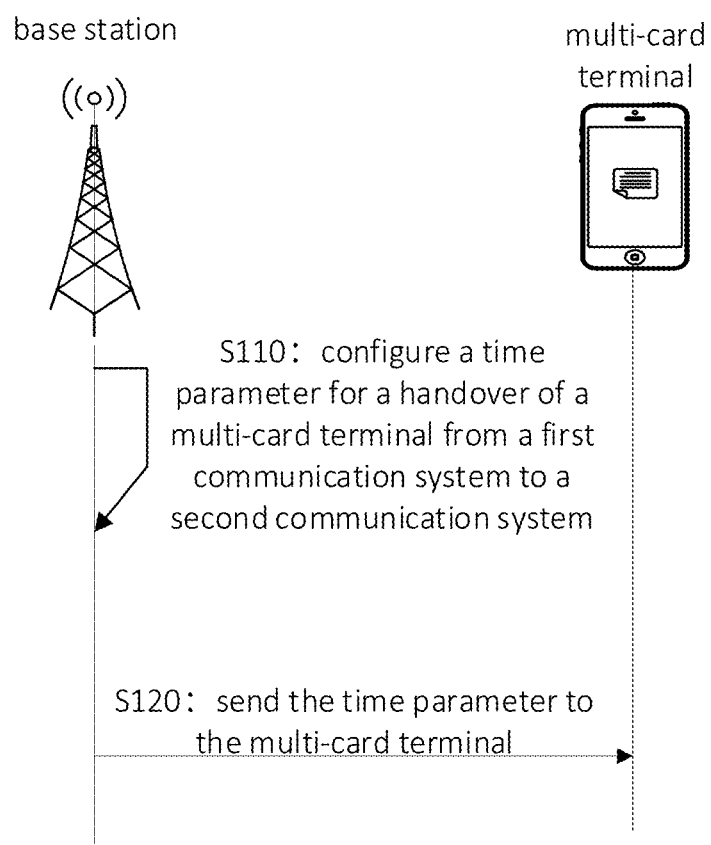
FIG. 2 is a flowchart illustrating a connection configuration method according to embodiments of the disclosure.

FIG. 2 is a flowchart illustrating a connection configuration method according to embodiments of the disclosure. As illustrated in FIG. 2, embodiments of the disclosure provide a connection configuration method. The method includes the following.

In block S110, a time parameter is configured for a handover of a multi-card terminal from a first communication system to a second communication system.

Here, the first communication system and the second communication system may be communication systems provided by different operators, or the first communication system and the second communication system may be communication systems corresponding to the same operator but based on different communication standards, such as, global system for mobile communications (GSM) and code division multiple access (CDMA). The first communication system and the second communication system can also be communication systems of the same operator and based on the same communication standard, for example, both are new radio (NR) systems.

Here, the time parameter may be set with reference to a specific operation performed by the multi-card terminal in the second communication system, for example, paging receiving, measurement, system information reading, and performing tracking area update (TAU) in the second communication system. The value of the time parameter may be obtained according to the empirical data of the above-mentioned specific operations, or determined by analyzing current operating data of the network based on current operating conditions of the network. The configuration may be performed manually, or may be automatically performed by the base station based on preset rules.

The time parameter includes at least one of: a duration, a starting time, and an ending time, and various time parameters of a departure duration in which the multi-card terminal leaves the first communication system via handover to the second communication system can be directly or indirectly determined.

In block S120, the time parameter is sent to the multi-card terminal.

Here, the multi-card terminal is a terminal that contains multiple subscriber identification modules. The multi-card terminal may be a terminal that contains at least two subscriber identification modules, for example, a double-card terminal or a triple-card terminal. A behavior mode of the multi-subscriber identification module terminal may be double card and double standby and single pass; double card and double standby and double pass; or triple card and triple standby. The subscriber identification module may be a subscriber identification module (SIM) card that exists in a separate individual form or an embedded subscriber identification module (e-SIM) that exists inside the terminal in an integrated form, and the like.

Here, the multi-card terminal may store the time parameter locally after receiving the time parameter, and apply the time parameter to an application flow of connection to the second communication system. The time parameter may be sent, through a broadcast signaling, to all the multi-card terminals that access the first communication system, or the time parameter is sent, through a unicast signaling, to a preset multi-card terminal that accesses the first communication system, which can be achieved through configuration by other configuration signalings (otherconfig) in the radio resource control reset signaling (RRCReconfiguration) and transmission.

The connection configuration method according to embodiments of the disclosure is applied to a network device on the network side, for example, various types of base stations, 3G base stations, 4G base stations, 5G base stations, macro base stations, micro base stations, or small base stations.

In this embodiment, the time parameter is configured for the handover of the multi-card terminal from the first communication system to the second communication system, and the time parameter is sent to the multi-card terminal. Therefore, reading paging or performing measurement by the multi-card terminal in the second communication system can bring a short interval of about 20 ms to the first communication system. From the perspective of the first communication system, the first communication system approximately experiences a shadow fading. Since each paging cycle will occur once, if the first communication system does not know the handover situation of the multi-card terminal, power control of the network and link adaptation algorithms may be affected, which may further cause resource waste in the first communication system. In this embodiment, the time parameter corresponding to the paging or measurement operation is configured, to enable a base station side to know the time of the handover of the multi-card terminal from the first communication system to the second communication system to perform the operations. Therefore, the problem of connection conflict and resource waste since the first communication system does not know the handover situation of the multi-card terminal is reduced.

In some embodiments, configuring the time parameter for the handover of the multi-card terminal from the first communication system to the second communication system includes: configuring different time parameters for different operations to be executed by the multi-card terminal in the second communication system; or, configuring the same time parameter for different operations to be executed by the multi-card terminal in the second communication system.

Here, in configurating different time parameters depending on different operations to be performed by the multi-card terminal in the second communication system, the different operations performed by the multi-card terminal in the second communication system include operations such as paging receiving, measuring, reading system information, and performing TAU.

For example, the base station #1 of the operator #1 sets, for the double card terminal UE #1, that a total duration in which the double card terminal UE #1 can leave the first communication system is 2s if the double card terminal UE #1 performs the TAU in the second communication system. The base station #1 of the operator #1 sets, for the double card terminal UE #1, that the double card terminal UE #1 can leave for is 1s if the double card terminal UE #1 reads system information in the second communication system.

In configuring different time parameters for performing different operations, the time parameters can be configured depending on execution times corresponding to different operations. Performing the TAU operation by the terminal in the second communication system may bring a long interval of 5 s to the first communication system. If a unique time parameter is universally set without distinguishing the specific operations, when the set time parameter is too long, it will cause that a duration in which the multi-card terminal disconnects from the first communication system is too long, which affects the service continuity. When the set time parameter is too short, it will cause that the operation of the multi-card terminal in the second communication system cannot be completed, which affects the realization of the communication function. In this embodiment, by configuring the time parameters for the execution times corresponding to different operations, communication continuity can be ensured, which is beneficial to achieve the realization of the communication function, improve resource utilization, and make the operation of the communication system more reliable. Here, depending on the different operations performed by the multi-card terminal in the second communication system, the same time parameter is configured. For example, the base station #1 of the operator #1 sets, for the double card terminal UE #1, that the total departure duration in which the double card terminal UE #1 leaves the first communication system is 2 s if the double card terminal UE #1 performs the TAU or the like in the second communication system.

Here, in configuring the same time parameter for different operations, since the first communication system, the second communication system, and the multi-card terminal do not need to distinguish the time parameters corresponding to different operations, the same time parameter that is generally applicable to various operations is configured according to the different operations performed by the multi-card terminal in the second communication system. For example, in a case where the TAU operation needs 2 s and the measurement operation needs 1 s, the time parameter can be universally set to 2 s. In this way, the first communication system, the second communication system, and the multi-card terminal do not need to obtain the time parameters of corresponding operation types based on specific operation types through such as distinguishing configurations, operation queries or the like at their respective ends, which simplifies the process and makes the configuration and communication process easier and more efficient.

Figure 3:
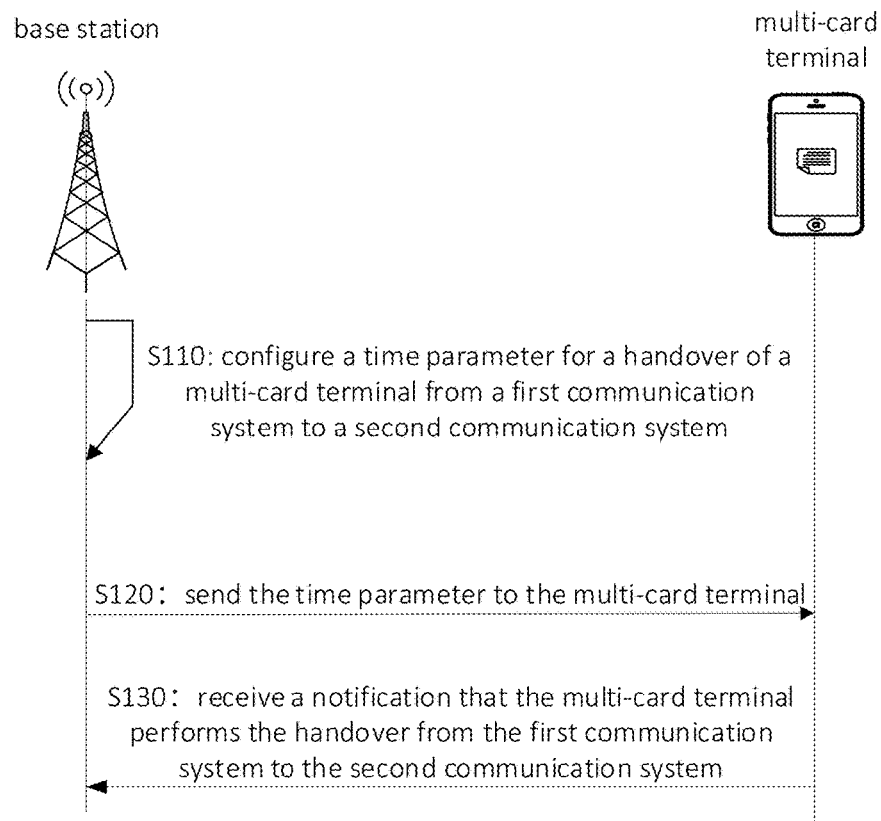
FIG. 3 is a flowchart illustrating a connection configuration method according to embodiments of the disclosure.

FIG. 3 is a flowchart illustrating a connection configuration method according to embodiments of the disclosure.

The method further includes: in block S130, a notification that the multi-card terminal performs the handover from the first communication system to the second communication system is received.

Here, by receiving the notification that the multi-card terminal performs the handover from the first communication system to the second communication system, the first communication system can determine the starting time that the multi-card terminal leaves the first communication system via the handover to the second communication system based on the transmission time and the arrival time of the notification. The departure time when the multi-card terminal leaves the first communication system via the handover to the second communication system to perform operations, i.e., the starting calculation point of the configured time parameter can be accurately determined, thereby achieving the synchronization of timing at each end and making the communication process more reliable and efficient.

Here, if the network of the first communication system configures different time parameters for different operations executed by the multi-card terminal in the network of the second communication system, the multi-card terminal may include information about the operation to be executed in the second communication system in the notification. In this way, the first communication system can accurately and efficiently process communication procedures.

Here, if the network of the first system configures the universal configuration for the multi-card terminal without distinguishing the operations, the multi-card terminal can only inform the first network that the multi-card terminal needs to perform an operation in the second network, or inform the first network that which specific operation is to be performed.

In some embodiments, the notification includes at least one of:
 a notification sent when a connection between the multi-card terminal and the second communication system conflicts with a connection between the multi-card terminal and the first communication system;
 a notification indicating that the multi-card terminal needs to perform an operation in the second communication system; or
 a notification indicating an operation type of an operation to be executed by the multi-card terminal in the second communication system.

Here, when the multi-card terminal needs to establish a communication connection with the second communication system, since the multi-card terminal has already established a communication connection with the first communication system, i.e., the communication connection resource corresponding to the multi-card terminal is already occupied by the first communication system, if the second communication system tries to occupy the communication connection resource, conflict of the resource occupation will be raised between the first communication system and the second communication system. If the communication connection with the first communication system is forcibly stopped, unknown failures and errors will occur. In this embodiment, the notification includes a notification sent when the connection between the multi-card terminal and the second communication system conflicts with the connection between the multi-card terminal and the first communication system. In this way, the connection with the first communication system that causes the confliction can be stopped in time, thereby reducing system failures or errors.

Here, the notification includes a notification indicating that the multi-card terminal needs to perform an operation in the second communication system. The multi-card terminal sends the notification indicating that the multi-card terminal needs to perform an operation in the second communication system to the first communication system to enable the first communication system to know the state of the multi-card terminal in time. In this way, relevant measures can be taken purposefully, such as the data exchange process corresponding to the multi-card terminal is temporarily disconnected to save communication resources.

Here, the notification includes a notification indicating the type of operation to be executed by the multi-card terminal in the second communication system. After the first communication system obtains the type of operation to be executed by the multi-card terminal in the second communication system, a corresponding operation time of the multi-card terminal in the second communication system can be obtained based on the configured time parameters, so that the communication process can be managed more accurately, system operation efficiency can be improved, and system resources can be saved.

Figure 4:
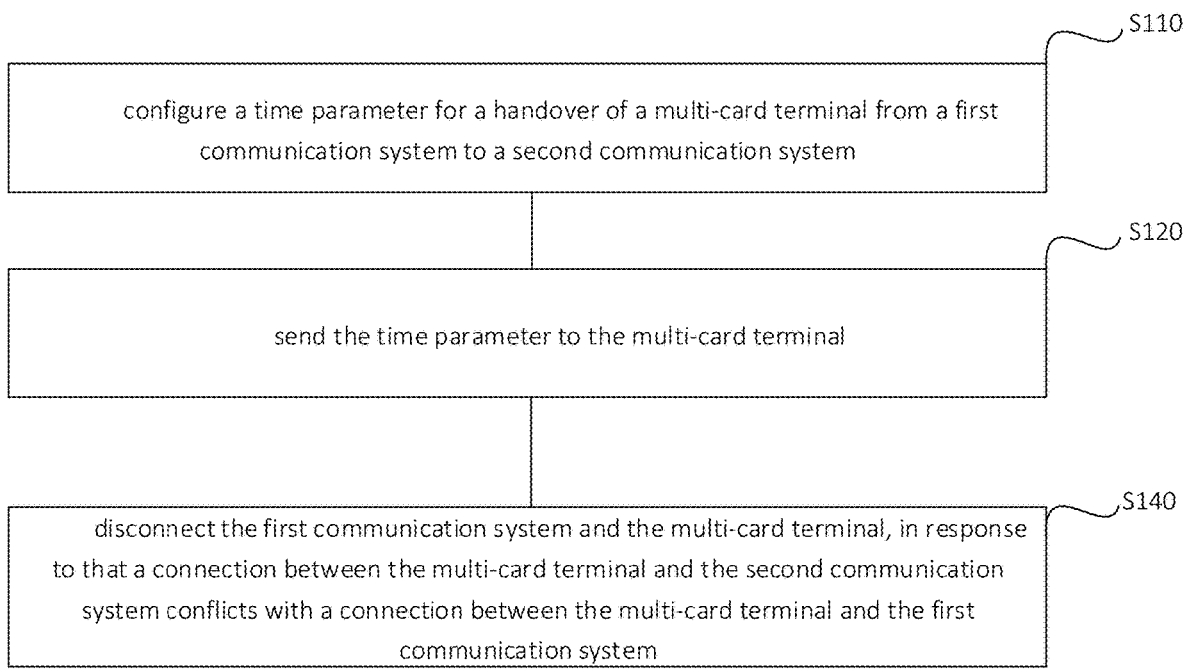
FIG. 4 is a flowchart illustrating a connection configuration method according to embodiments of the disclosure.

FIG. 4 is a flowchart illustrating a connection configuration method according to embodiments of the disclosure. The method further includes: a block S140 of disconnecting the first communication system from the multi-card terminal, in response to that a connection between the multi-card terminal and the second communication system conflicts with a connection between the multi-card terminal and the first communication system.

Here, when the multi-card terminal needs to establish a communication connection with the second communication system, since the multi-card terminal has already established a communication connection with the first communication system, i.e., the communication connection resource corresponding to the multi-card terminal is already occupied by the first communication system, if the second communication system tries to occupy the communication connection resource, confliction of the resource occupation will be raised between the first communication system and the second communication system. In this embodiment, when the connection between the multi-card terminal and the second communication system conflicts with the connection with the connection between the multi-card terminal and the first communication system, the first communication system is disconnected from the multi-card terminal. By actively stopping the communication connection with the first communication system, the confliction can be reduced, and failures and system errors caused by the conflictions can be reduced.

In some embodiments, the method further includes: determining a duration in which the multi-card terminal leaves the first communication system based on the operation type of the operation to be executed by the multi-card terminal in the second communication system and the time parameter.

Here, when the base station configures the multi-card terminal, the operation type corresponding to the configuration and the time parameter can be stored in the base station in the form of a table. In this way, after knowing the type of operation to be executed by the multi-card terminal in the second communication system, the duration during which the terminal leaves the first communication system can be determined in a querying manner.

In some embodiments, the data transmission with the multi-card terminal is stopped within the duration corresponding to the time parameter, which reduces errors and failures caused by operation confliction, and the corresponding system resources can be disconnected at the same time, to save resources.

Figure 5:
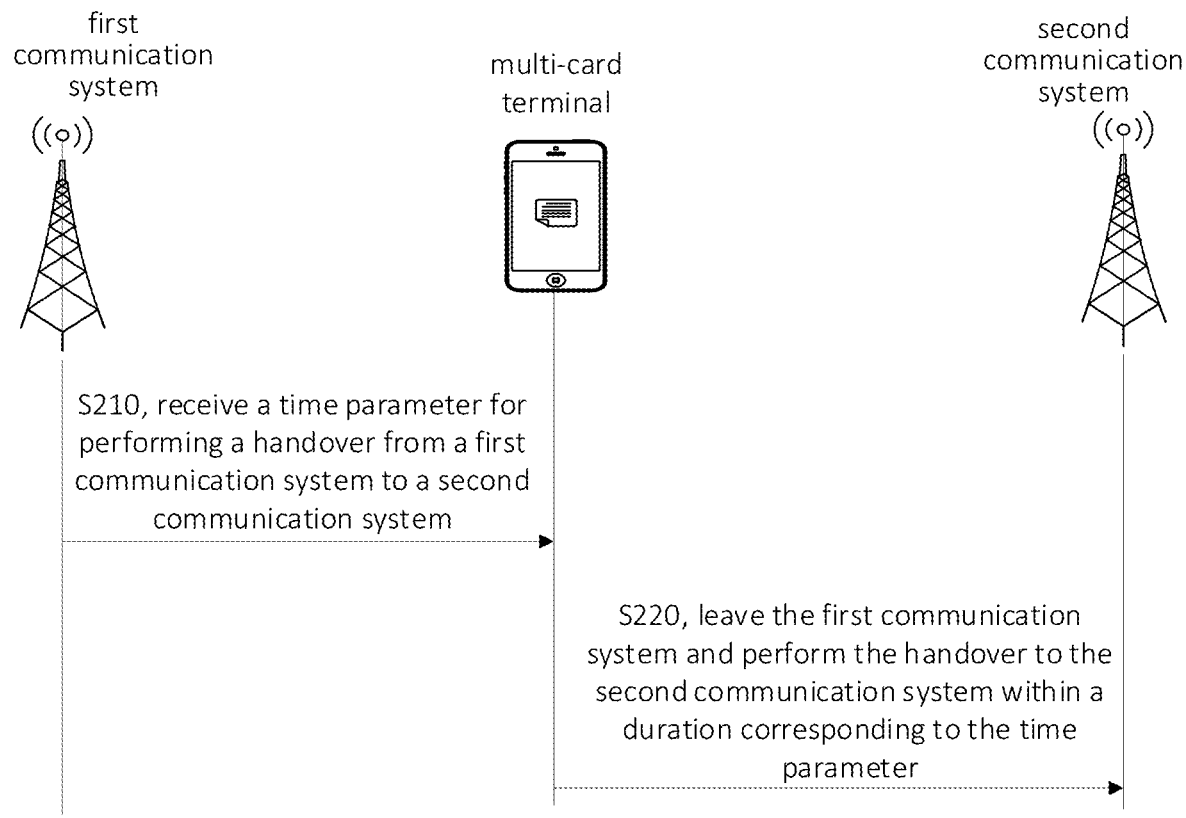
FIG. 5 is a flowchart illustrating a connection configuration method according to embodiments of the disclosure.

FIG. 5 is a flowchart illustrating a connection configuration method according to embodiments of the disclosure. Embodiments of the disclosure provide a connection configuration method. The method includes the following.

In block S210, a time parameter for performing a handover from a first communication system to a second communication system is received.

Here, the time parameter may be determined by referring to the specific operation performed by the multi-card terminal in the second communication system sent by the first communication system. For example, the time parameter can be determined based on operations such as paging receiving, measurement, system information reading, and performing TAU in the second communication system, and the setting value of the time parameter may be obtained based on empirical data of the foregoing specific operations.

The setting value of the time parameter can also be determined based on a current operating condition of the network by analyzing the current operating data of the network.

In block S220, the connection with the first communication system is stopped and the handover to the second communication system is performed within a duration corresponding to the time parameter.

Here, the multi-card terminal may leave the first communication system and be connected to the second communication system via the handover, to perform operations such as paging receiving, measurement, system information reading, and performing TAU within the duration corresponding to the time parameter.

In some embodiments, a notification of performing a handover of the multi-card terminal to the second communication system is sent to the first communication system. Here, if the network of the first communication system configures different time parameters for the multi-card terminal depending on different operations executed in the network of the second communication system, the multi-card terminal may include information which operation is to be executed in the second communication system in the notification. In this way, the first communication system can accurately and efficiently process the communication process.

In some embodiments, sending the notification that the handover to the second communication system is performed to the first communication system includes:
  sending a notification when a connection between a multi-card terminal and the second communication system conflicts with a connection between the multi-card terminal and the first communication system; or,
  sending, to the first communication system, a notification indicating that there is an operation to be executed in the second communication system; or,
  sending, to the first communication system, a notification indicating an operation type of an operation to be executed in the second communication system.

Here, the notification includes a notification sent by the multi-card terminal when the connection between the multi-card terminal and the second communication system conflicts with the connection between the multi-card terminal and the first communication system. In this way, the connection with the first communication system that causes the confliction can be stopped in time to system failure or error.

Here, the notification includes a notification, sent by the multi-card terminal to the first communication system, indicating that there is an operation to be executed in the second communication system. The multi-card terminal sends the notification indicating that the multi-card terminal needs to perform an operation in the second communication system to the first communication system, which enables the first communication system to know the situation of the multi-card terminal in time. Therefore, relevant measures can be taken purposefully. For example, the data interaction process corresponding to the multi-card terminal is temporarily disconnected, thereby saving communication resources.

Here, the notification includes the notification indicating an operation type of an operation to be executed in the second communication system send by the multi-card terminal to the first communication system. After the first communication system knows the type of operation to be executed by the multi-card terminal in the second communication system, based on the configured time parameter, the corresponding operation time of the multi-card terminal in the second communication system can be obtained. Therefore, the communication process can be managed more accurately, system operation efficiency can be improved, and system resources can be saved.

In some embodiments, when it is determined that different time parameters are configured for different operations in the second communication system based on the time parameters, the notification indicating the type of the operation to be executed in the second communication system is sent to the first communication system.

Here, when it is determined according to the time parameter that different time parameters are configured for different operations performed in the second communication system, a notification indicating the type of operation to be executed in the second communication system is sent to the first communication system, such that the first communication system determines, based on the operation type, the time parameter corresponding to the operation type. Based on the time parameter, the communication process can be accurately configured and managed. For example, if a certain connection needs to be disconnected, the time for disconnecting a certain connection can be set as the time parameter corresponding to the operation type, such that the resource utilization rate is the highest and the operating efficiency of the system is improved.

In some embodiments, within the duration, the data transmission with the first communication system is stopped. In this way, the confliction between the connection with the first communication system and the connection with the second communication system is reduced, and unknown errors and system failures can be reduced, which is beneficial to improving the resource utilization rate of the first communication system.

Figure 6:
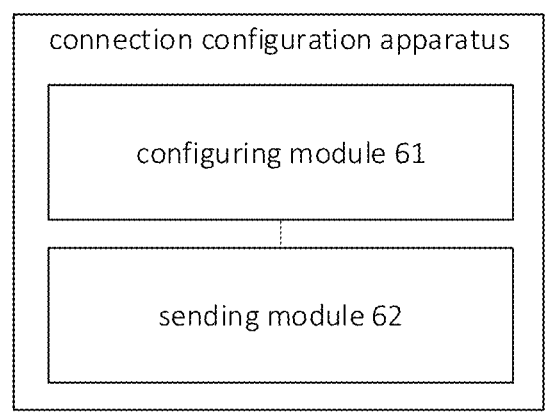
FIG. 6 is a schematic diagram illustrating a connection configuration apparatus according to embodiments of the disclosure.

FIG. 6 is a schematic diagram illustrating a connection configuration apparatus according to embodiments of the disclosure. The embodiments of the disclosure provide a connection configuration apparatus. The apparatus includes: a configuring module 61 and a sending module 62.

The configuring module 61 is configured to configure a time parameter for a handover of a multi-card terminal from a first communication system to a second communication system.

The sending module 62 is configured to send the time parameter to the multi-card terminal.

Figure 7:
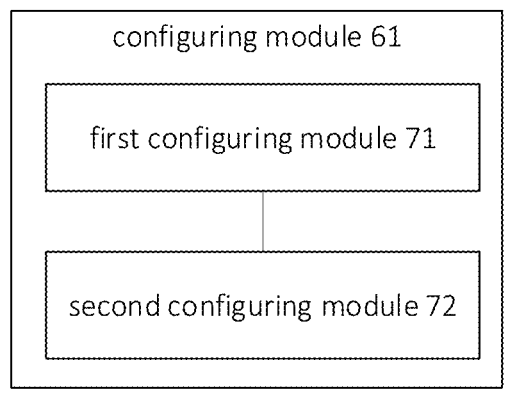
FIG. 7 is a schematic diagram illustrating a connection configuration apparatus according to embodiments of the disclosure.

FIG. 7 is a schematic diagram illustrating a connection configuration apparatus according to another embodiment of the disclosure. The configuring module includes: a first configuring module 71 and a second configuring module 72.

The first configuring module 71 is configured to configure different time parameters for different operations to be executed by the multi-card terminal in the second communication system.

The second configuring module 72 is configured to configure the same time parameter for different operations to be executed by the multi-card terminal in the second communication system.

Figure 8:
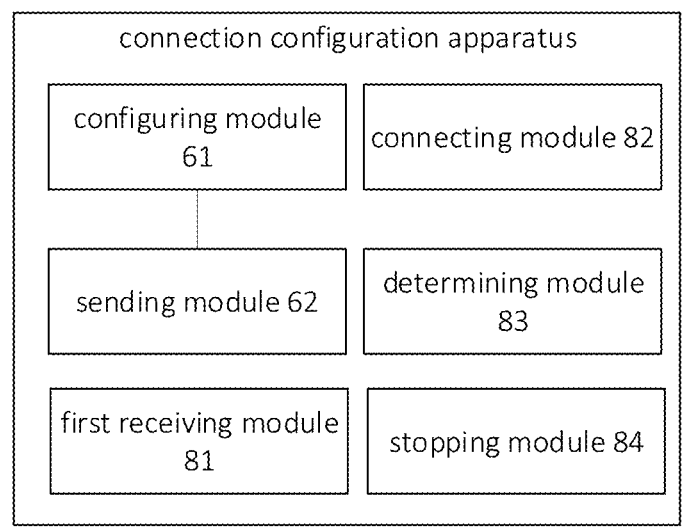
FIG. 8 is a schematic diagram illustrating a connection configuration apparatus according to embodiments of the disclosure.

FIG. 8 is a schematic diagram illustrating a connection configuration apparatus according to embodiments of the disclosure. The apparatus includes: a first receiving module 81, configured to receive a notification that the multi-card terminal performs the handover from the first communication system to the second communication system.

As illustrated in FIG. 8, in another embodiment, the apparatus further includes: a connecting module 82, configured to disconnect the first communication system and the multi-card terminal, in response to that a connection between the multi-card terminal and the second communication system conflicts with a connection between the multi-card terminal and the first communication system.

As illustrated in FIG. 8, in another embodiment, the apparatus further includes: a determining module 83, configured to determine a duration in which the multi-card terminal leaves the first communication system based on the operation type of the operation to be executed by the multi-card terminal in the second communication system and the time parameter.

As illustrated in FIG. 8, in another embodiment, the apparatus further includes: a stopping module 84, configured to stop data transmission with the multi-card terminal within a duration corresponding to the time parameter.

Figure 9:
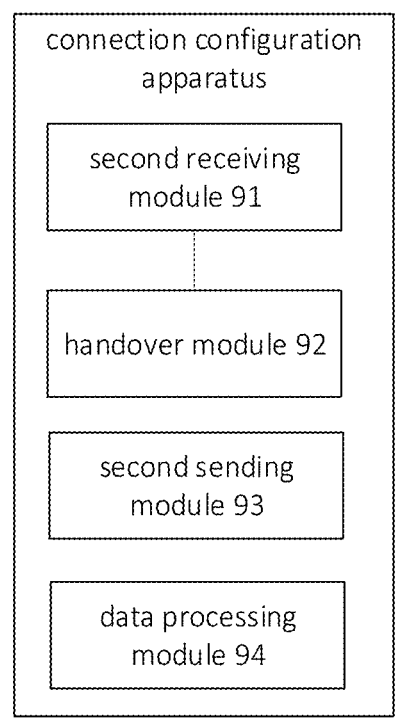
FIG. 9 is a schematic diagram illustrating a connection configuration apparatus according to embodiments of the disclosure.

FIG. 9 is a schematic diagram illustrating a connection configuration apparatus according to embodiments of the disclosure. The embodiments of the disclosure provide a connection configuration apparatus. The apparatus includes: a second receiving module 91 and a handover module 92.

The second receiving module 91 is configured to receive a time parameter for performing a handover from a first communication system to a second communication system.

The handover module 92 is configured to leave the first communication system and perform the handover to the second communication system within a duration corresponding to the time parameter.

As illustrated in FIG. 9, the apparatus further includes: a second sending module 93, configured to send to the first communication system, a notification that the handover to the second communication system is performed.

The second sending module 93 is further configured to send the notification indicating the operation type of the operation to be executed in the second communication system to the first communication system, in response to determining, based on the time parameter, that different time parameters are configured for different operations executed in the second communication system.

As illustrated in FIG. 9, the apparatus further includes: a data processing module 94, configured to stop data transmission with the first communication system within the duration.

Embodiments of the disclosure provide a communication device. The communication device includes: an antenna, a memory, and a processor. The processor is connected to the antenna and the memory respectively, is configured to control the antenna to send and receive radio signals by executing an executable program stored on the memory, and is configured to execute blocks of the connection configuration method according to any one of the above embodiments.

The communication device in this embodiment may be the above terminal or base station. The terminal can be a variety of handhold terminals or vehicle-mounted terminals.

The base station may be various types of base stations, for example, a 4G base station or a 5G base station.

The antenna may be various types of antennas, for example, a mobile antenna such as a 3G antenna, a 4G antenna, or a 5G antenna. The antenna may also include a WiFi antenna or a wireless charging antenna.

The memory may include various types of storage media, and the storage media is a non-transitory computer storage medium that can continue to store the information stored thereon after the communication device is powered off.

The processor may be connected to the antenna and the memory through a bus or the like, and is configured to read executable programs stored on the memory, for example, through the random-access method shown in FIG. 2, FIG. 3, FIG. 4, and/or FIG. 5.

Embodiments of the disclosure also provide a non-transitory computer-readable storage medium, and the non-transitory computer-readable storage medium stores an executable program. When the executable program is executed by a processor, the random access method according to any one of the above embodiments is implemented, for example, at least one of the method shown in FIG. 2, FIG. 3, FIG. 4 and/or FIG. 5.

Figure 10:
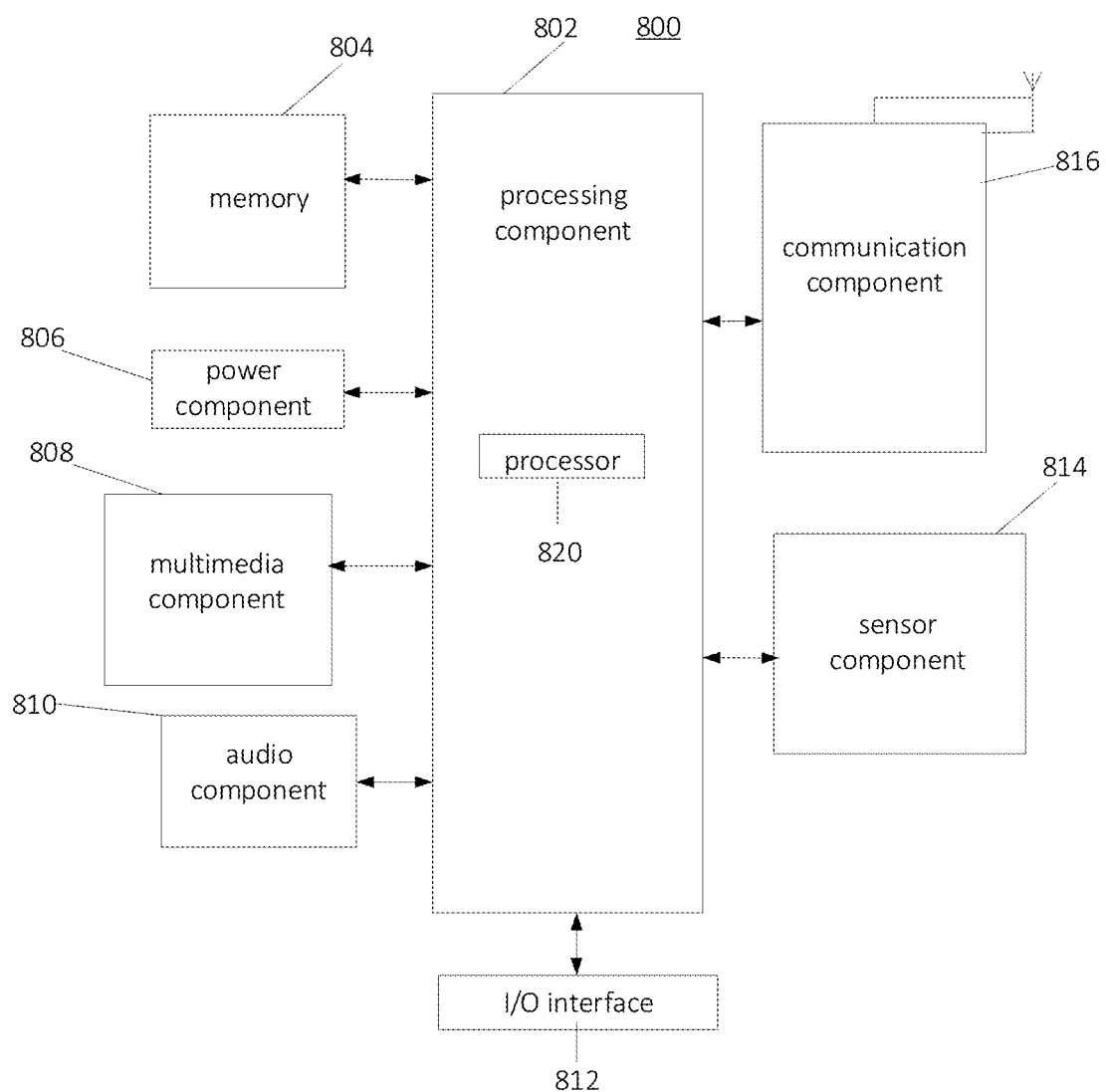
FIG. 10 is a schematic diagram illustrating a terminal according to embodiments of the disclosure.

FIG. 10 is a schematic diagram illustrating a terminal according to embodiments of the disclosure.

Referring to the terminal 800 illustrated in FIG. 10, embodiments of the disclosure provide the terminal 800. The terminal may be a mobile phone, a computer, a digital broadcasting terminal, a message transceiver device, a game console, a tablet device, a medical device, a fitness device and a personal digital assistant.

As illustrated in FIG. 10, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the terminal 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phone-book data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the terminal 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a radio network based on a communication standard, such as WiFi, 2G, or 3G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 804, executable by the processor 820 in the terminal 800, for performing the above method. For example, the non-transitory computer-readable storage medium may be a ROM, a RAM, a CD-ROM, a magnetic tape, a floppy disc, an optical data storage device, and the like.

The terminal may be used to implement the aforementioned connection configuration method, for example, the connection configuration method as illustrated in FIG. 2 to FIG. 5.

Figure 11:
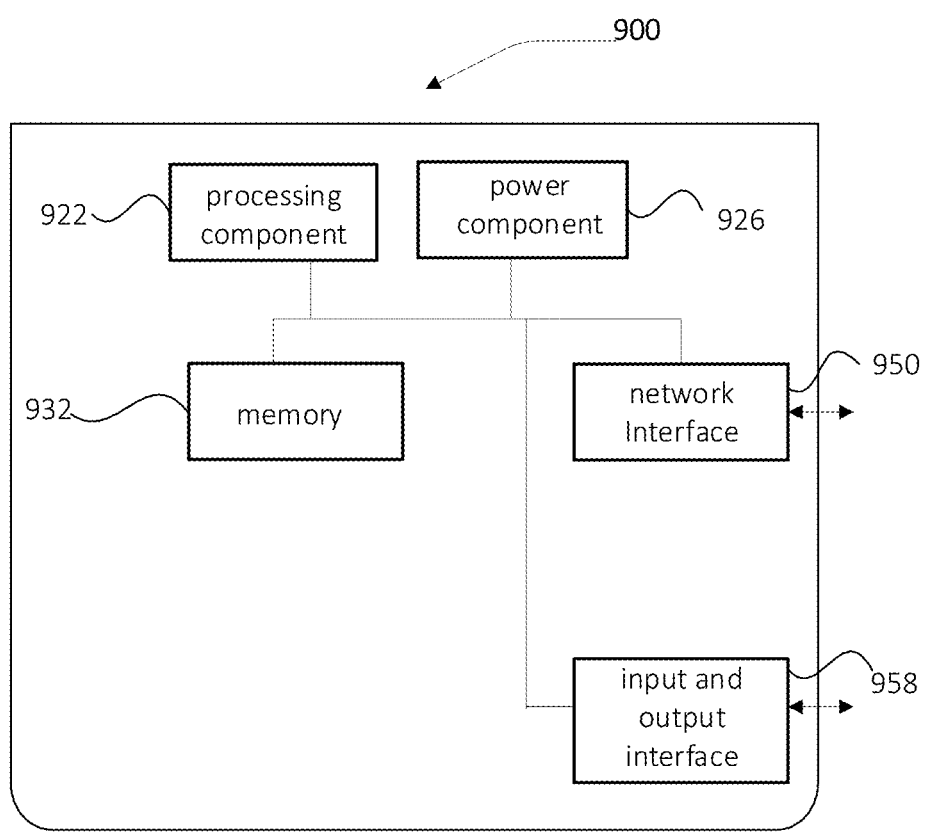
FIG. 11 is a schematic diagram illustrating a base station according to embodiments of the disclosure.

FIG. 11 is a schematic diagram illustrating a base station according to embodiments of the disclosure. For example, the base station 900 may be provided as a network side device. As illustrated in FIG. 11, the base station 900 includes a processing component 922. The processing component 922 further includes one or more processors, and a memory resource represented by a memory 932, for storing instructions that can be executed by the processing component 922, such as application programs. The application programs stored in the memory 932 may include one or more modules each corresponding to a set of instructions. In addition, the processing component 922 is configured to execute instructions to execute the random access method according to any one of the above embodiments, such as the method shown in FIG. 2 to FIG. 5.

The base station 900 may also include a power component 926 configured to perform power management of the base station 900, a wired or wireless network interface 950 configured to connect the base station 900 to a network, and an input/output (I/O) interface 958. The base station 900 can operate based on an operating system stored in the memory 932, such as Windows Server™, Mac OS X™, Unix™, Linux™, FreeBSD™ or the like.

The radio network interface 950 includes but is not limited to the antenna of the aforementioned communication device. Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

In embodiments of the disclosure, a time parameter for a handover of a multi-card terminal from a first communication system to a second communication system is configured, and the time parameter is sent to a multi-card terminal, so that the time parameter for the handover of the multi-card terminal from the first communication system to the second communication system is configured to enable a base station side to know the time of the handover of the multi-card terminal from the first communication system to the second communication system to perform operations. Therefore, a problem of connection conflict and resource waste due to the first communication system not knowing the situation of the handover of the multi-card terminal is reduced.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A connection configuration method, comprising:
configuring a time parameter for a handover of a multi-card terminal from a first communication system accessed by a first subscriber identification module of the multi-card terminal to a second communication system accessed by a second subscriber identification module of the multi-card terminal, wherein the first communication system is provided by a first network operator, the second communication system is provided by a second network operator;
sending the time parameter to the multi-card terminal;
wherein configuring the time parameter for the handover of the multi-card terminal from the first communication system to the second communication system comprises: configuring different time parameters for different operations to be executed by the multi-card terminal in the second communication system; and
receiving a notification that the multi-card terminal performs the handover from the first communication system to the second communication system; wherein the notification comprises a notification indicating an operation type of an operation to be executed by the multi-card terminal in the second communication system; wherein the notification is sent by the multi-card terminal to the first communication system, in response to determining, by the multi-card terminal based on the time parameter, that different time parameters are configured for different operations executed in the second communication system.

2. The method of claim 1, wherein the notification comprises:
a notification sent when a connection between the multi-card terminal and the second communication system conflicts with a connection between the multi-card terminal and the first communication system.

3. The method of claim 2, further comprising:
disconnecting the first communication system and the multi-card terminal, in response to that a connection between the multi-card terminal and the second communication system conflicts with a connection between the multi-card terminal and the first communication system.

4. The method of claim 2, further comprising:
determining a duration in which the multi-card terminal is disconnected from the first communication system based on the operation type of the operation to be executed by the multi-card terminal in the second communication system and the time parameter.

5. The method of claim 1, further comprising:
stopping data transmission with the multi-card terminal within a duration corresponding to the time parameter.

6. A connection configuration method, comprising:
receiving a time parameter for performing a handover from a first communication system accessed by a first subscriber identification module of the multi-card terminal to a second communication system accessed by a second subscriber identification module of the multi-card terminal, wherein the first communication system is provided by a first network operator, the second communication system is provided by a second network operator, and different time parameters are configured for different operations to be executed by the multi-card terminal in the second communication system;
disconnecting from the first communication system and performing the handover to the second communication system within a duration corresponding to the time parameter; and
sending, to the first communication system, a notification that the handover to the second communication system is performed;
wherein sending, to the first communication system, the notification that the handover to the second communication system is performed, comprises: sending the notification indicating the operation type of the operation to be executed in the second communication system to the first communication system, in response to determining, based on the time parameter, that different time parameters are configured for different operations executed in the second communication system.

7. The method of claim 6, wherein sending, to the first communication system, the notification that the handover to the second communication system is performed, comprises:
sending a notification when a connection between a multi-card terminal and the second communication system conflicts with a connection between the multi-card terminal and the first communication system.

8. The method of claim 6, further comprising:
stopping data transmission with the first communication system within the duration.

9. A communication device, comprising:
an antenna;
a memory; and
a processor, connected to the antenna and the memory respectively, and configured to control the antenna to send and receive radio signals by executing an executable program stored on the memory, and configured to execute a connection configuration method according to claim 1.

10. A non-transitory computer-readable storage medium comprising an executable program, wherein when the executable program is executed by a processor, a connection configuration method according to claim 1 is implemented.

11. A communication device, comprising:
an antenna;
a memory; and
a processor, connected to the antenna and the memory respectively, and configured to control the antenna to send and receive radio signals by executing an executable program stored on the memory, and configured to:
receive a time parameter for performing a handover from a first communication system accessed by a first subscriber identification module of the multi-card terminal to a second communication system accessed by a second subscriber identification module of the multi-card terminal, wherein the first communication system is provided by a first network operator, the second communication system is provided by a second network operator, and different time parameters are configured for different operations to be executed by the multi-card terminal in the second communication system;

disconnect with the first communication system and perform the handover to the second communication system within a duration corresponding to the time parameter; and send, to the first communication system, a notification that the handover to the second communication system is performed;

wherein when sends, to the first communication system, the notification that the handover to the second communication system is performed, the processor is further configured to: send a notification indicating an operation type of the operation to be executed in the second communication system to the first communication system, in response to determining, based on the time parameter, that different time parameters are configured for different operations executed in the second communication system.

12. The communication device of claim 11, wherein the processor is further configured to:
send a notification when a connection between a multi-card terminal and the second communication system conflicts with a connection between the multi-card terminal and the first communication system.

13. The communication device of claim 11, wherein the processor is further configured to:
stop data transmission with the first communication system within the duration.

14. A non-transitory computer-readable storage medium comprising an executable program, wherein when the executable program is executed by a processor, a connection configuration method according to claim 6 is implemented.

* * * * *